(12) United States Patent
Petrissans et al.

(10) Patent No.: US 11,345,481 B2
(45) Date of Patent: May 31, 2022

(54) ASSEMBLY FOR AN AIRCRAFT, THE ASSEMBLY COMPRISING A PYLON, AN ENGINE MOUNT AND AN ATTACHMENT SYSTEM BETWEEN THE PYLON AND THE ENGINE MOUNT

(71) Applicant: Airbus Operations SAS, Toulouse (FR)

(72) Inventors: Isabelle Petrissans, Cugnaux (FR); Rémi Lansiaux, Toulouse (FR); Pascal Forichon, Toulouse (FR); Patrice Perez, Fronton (FR); Wan Hu, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 275 days.

(21) Appl. No.: 16/826,993

(22) Filed: Mar. 23, 2020

(65) Prior Publication Data

US 2020/0307815 A1  Oct. 1, 2020

(30) Foreign Application Priority Data

Mar. 26, 2019 (FR) ...................................... 1903152

(51) Int. Cl.
*B64D 27/26* (2006.01)
(52) U.S. Cl.
CPC ................................... *B64D 27/26* (2013.01)
(58) Field of Classification Search
CPC .............................. B64D 27/26; F16B 33/002
See application file for complete search history.

(56) References Cited

U.S. PATENT DOCUMENTS

| 2,529,955 | A | * | 11/1950 | Frederick | .................. | F02C 7/20 |
| | | | | | | 60/797 |
| 2,680,346 | A | * | 6/1954 | Michael | ................. | B64D 27/26 |
| | | | | | | 244/74 |
| 3,006,587 | A | * | 10/1961 | Morel | ................. | F16C 11/0614 |
| | | | | | | 248/554 |

(Continued)

FOREIGN PATENT DOCUMENTS

| DE | 102011075919 A1 | * | 11/2012 | ............ | F16B 33/002 |
| DE | 102011075919 A1 | | 11/2012 | | |

OTHER PUBLICATIONS

DE102011075919A1 Translation (Year: 2012).*
French Search Report; priority document.

*Primary Examiner* — Richard R. Green
*Assistant Examiner* — Steven J Shur
(74) *Attorney, Agent, or Firm* — Greer, Burns & Crain, Ltd.

(57) ABSTRACT

An assembly for an aircraft, which includes a pylon with a bearing face and a contact face, an engine mount with a bearing face and a contact face bearing against the contact face of the pylon, at least two bolts comprising a threaded stem with a head and a nut bearing against the bearing face of the engine mount, for each head, a bearing washer with a first bearing face and a second bearing face, where the second bearing face of the bearing washer bears against the bearing face of the pylon, and where the head bears against the first bearing face of the bearing washer, a shoe, and, for each bearing washer, a clamp that is secured to the shoe and comprises a first branch and a second branch between which the bearing washer is clamped and is free to rotate.

5 Claims, 1 Drawing Sheet

(56) References Cited

U.S. PATENT DOCUMENTS

| | | | | |
|---|---|---|---|---|
| 4,065,077 A | * | 12/1977 | Brooks | B64D 27/26 60/797 |
| 4,603,822 A | * | 8/1986 | Chee | F02C 7/20 244/54 |
| 4,805,851 A | * | 2/1989 | Herbst | F16F 1/371 244/54 |
| 2008/0042007 A1 | * | 2/2008 | Machado | B64D 27/26 244/54 |

* cited by examiner

ASSEMBLY FOR AN AIRCRAFT, THE ASSEMBLY COMPRISING A PYLON, AN ENGINE MOUNT AND AN ATTACHMENT SYSTEM BETWEEN THE PYLON AND THE ENGINE MOUNT

CROSS-REFERENCES TO RELATED APPLICATIONS

This application claims the benefit of the French patent application No. 1903152 filed on Mar. 26, 2019, the entire disclosures of which are incorporated herein by way of reference.

FIELD OF THE INVENTION

The present invention relates to an assembly for an aircraft, where the assembly comprises a pylon, an engine mount and an attachment system between the pylon and the engine mount, and to an aircraft comprising at least one such assembly.

BACKGROUND OF THE INVENTION

An aircraft conventionally comprises a wing, beneath which there is attached a pylon, to which there is attached an engine. The engine is attached to the pylon via a system of engine mounts which consists, inter alia, of a front engine mount at the front and of a rear engine mount at the rear.

The pylon comprises a sole plate which extends in the lower part of the pylon and the engine mount is secured beneath the sole plate.

The attachment between the pylon and the engine mount is established by means of bolts which press the engine mount against the lower face of the sole plate. To that end, each bolt, the sole plate and the engine mount comprise a through-bore.

Each attachment system comprises a threaded stem, a nut and a bearing washer.

The bearing washer is placed against the upper face of the sole plate, the head of the threaded stem comes to bear against the bearing washer and the threaded stem passes in succession through the bore of the sole plate and the bore of the engine mount. The nut is then screwed onto the end of the threaded stem.

In order to avoid loss of the bearing washers of the various attachment systems, the bearing washers are secured to one another by arms, to which they are welded.

Although an installation of this kind is satisfactory, it is possible that, during installation, the force which is exerted in order to tighten the bolt causes the corresponding bearing washer to rotate. Such a rotation has the consequence of deforming the arms. In order to avoid deformation of this kind, the arms are relatively heavy in order to have adequate rigidity.

SUMMARY OF THE INVENTION

The present invention has an object of proposing an assembly for an aircraft where the assembly comprises a pylon, an engine mount and an attachment system between the pylon and the engine mount, and where the attachment system comprises a bearing washer which is captive and free to rotate about its axis, making it possible to reduce the weight of the elements securing the bearing washers to one another.

To that end, what is proposed is an assembly for an aircraft, the assembly comprising:
a pylon having a bearing face and a contact face oriented away from the bearing face,
an engine mount having a bearing face and a contact face oriented away from the bearing face, where the contact face of the engine mount bears against the contact face of the pylon,
at least two bolts, each one comprising a threaded stem with a head and a nut bearing against the bearing face of the engine mount,
for each head, a bearing washer with a first bearing face and a second bearing face, where the second bearing face of the bearing washer bears against the bearing face of the pylon, and where the head bears against the first bearing face of the bearing washer,
a shoe, and
for each bearing washer, a clamp that is secured to the shoe and comprises a first branch and a second branch between which the bearing washer is clamped and is free to rotate about its axis.

With such an assembly, the bearing washer cannot escape and remains captive as it is installed, resulting in time saved during installation. Moreover, the bearing washer is free to rotate about its axis so as to avoid deformation of the attachment system when a torque is applied to the bolt.

Advantageously, the first branch is against the first bearing face of the bearing washer and the second branch is against the second bearing face of the bearing washer.

Advantageously, each branch comprises a plate, the bearing washer has a central crown and an outer crown that is thinner than the central crown, and each plate comprises a circular imprint, the diameter of which is between the diameter of the central crown and the diameter of the outer crown.

Advantageously, the assembly comprises, for each bolt, an immobilizing plate removably attached to the shoe, the head has an external imprint, and the immobilizing plate has a counter-imprint, where the external imprint and the counter-imprint cooperate in order to prevent the immobilizing plate from rotating relative to the head of the bolt.

The invention also proposes an aircraft comprising at least one assembly according to one of the above variants.

BRIEF DESCRIPTION OF THE DRAWINGS

The above-mentioned features of the invention, along with others, will become more clearly apparent on reading the following description of one exemplary embodiment, the description being given with reference to the appended drawings, in which.

DETAILED DESCRIPTION OF THE PREFERRED EMBODIMENTS

Figure 1:
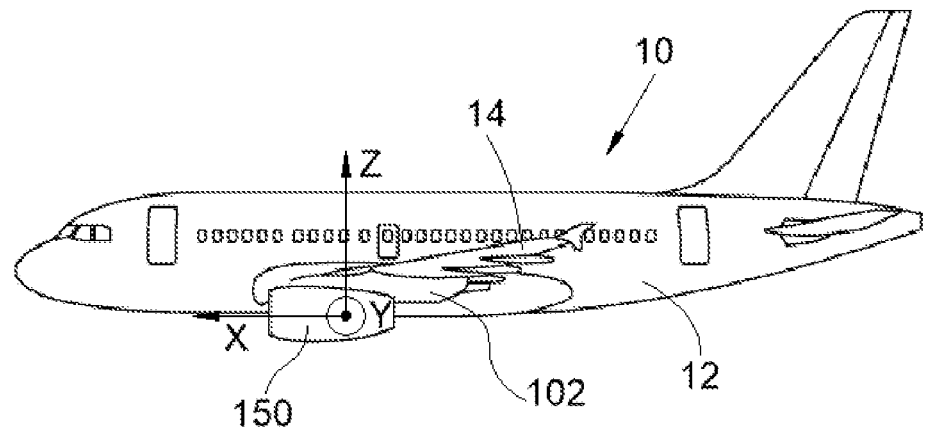
FIG. 1 is a side view of an aircraft having at least one assembly according to the invention.

In the following description, terms relating to a position are considered in relation to an aircraft in a position of normal advance, that is to say, as shown in FIG. 1.

FIG. 1 shows an aircraft 10 which comprises a fuselage 12 having a wing 14 on either side, and beneath each wing 14 there is attached a pylon 102.

An engine 150 is attached to the pylon 102.

Throughout the following description, and by convention, the X direction corresponds to the longitudinal direction of the engine 150, this direction being parallel to the longitudinal axis of the engine 150. Also, the Y direction corresponds to the direction oriented transversely relative to the engine 150, and the Z direction corresponds to the vertical or height direction, these three directions X, Y, Z being orthogonal to one another.

Figure 2:
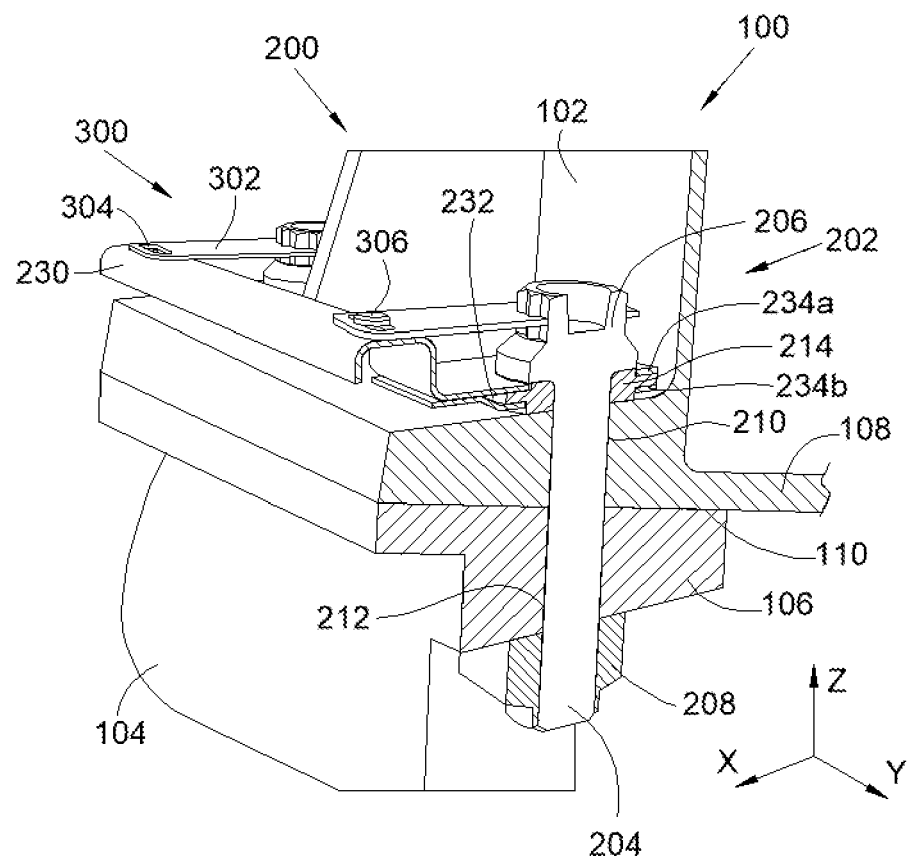
FIG. 2 is a view in perspective and in section through a vertical plane of an assembly according to the invention.

FIG. 2 shows an assembly 100 according to the invention which is installed in the aircraft 10.

The assembly 100 comprises the pylon 102 and an engine mount 104 which, in this case, is a front engine mount. For reasons of simplicity, the engine 150 is not shown in FIG. 2, but it is attached to the engine mount 104.

The engine mount 104, which is thus attached between the pylon 102 and the engine 150, comprises, in this case, a beam 106 and the pylon 102 has, in this case, a sole plate 108 which extends in the lower part of the pylon 102.

The sole plate 108, and more generally the pylon 102, has a bearing face and a contact face oriented away from the bearing face and, in the same manner, the beam 106, and more generally the engine mount 104, has a bearing face and a contact face oriented away from the bearing face.

The engine mount 104 bears against the contact face of the pylon 102, that is to say, in this case, that the beam 106 and the sole plate 108 bear against one another by their contact faces which are in a contact plane 110 which, in this case, is generally horizontal. In this case, the beam 106 is secured beneath the sole plate 108.

In the embodiment of the invention presented here, the contact face of the sole plate 108 corresponds to an underside of the sole plate 108 and the contact face of the beam 106 corresponds to an upper face of the beam 106.

The assembly 100 also comprises an attachment system 200 which comprises at least two bolts 202 for avoiding rotation of the engine mount 104 relative to the pylon 102, each one comprising a threaded stem 204 with a head 206 and a nut 208. Conventionally, there are three bolts 202 that are distributed transversely.

For each threaded stem 204, the pylon 102 comprises a first bore 210 and the engine mount 104 comprises a second bore 212 that is coaxial with the first bore 210.

For each head 206, the attachment system 200 comprises a bearing washer 214 with a first bearing face and a second bearing face.

The second bearing face of the bearing washer 214 bears against the bearing face of the pylon 102, and the head 206 bears against the first bearing face of the bearing washer 214, and the threaded stem 204 passes in succession through the first bore 210 and the second bore 212. The nut 208 is then screwed onto the end of the threaded stem 204 and comes to bear against the bearing face of the engine mount 104.

In general, the sole plate 108, and more generally the pylon 102, and the beam 106, and more generally the engine mount 104, are sandwiched between the head 206 and the nut 208 and the bearing washer 214 is arranged between the head 206 and the pylon 102.

The attachment system 200 comprises a shoe 230 and, for each bearing washer 214, a clamp 232 that is secured to the shoe 230.

The shoe 230 extends along the various bolts 202 and, in this case, is in the form of a profile.

Each clamp 232 comprises a first branch 234a and a second branch 234b between which the associated bearing washer 214 is clamped, and thus the bearing washers 214 cannot become lost since they remain between the branches 234a-b. Moreover, the presence of the shoe 230 which holds all of the bearing washers 214 means that once one bearing washer 214 is attached, the others are held in place. Each clamp 232 is shaped so as to naturally maintain a tightened position of the branches 234a-b.

Moreover, each bearing washer 214 is free to rotate about its axis between the branches 234a-b as the bolt 202 is tightened or loosened. Thus, there is no longer any risk of deformation since the bearing washer 214 is free to rotate.

The first branch 234a is against the first bearing face of the bearing washer 214 and the second branch 234b is against the second bearing face of the bearing washer 214.

The first branch 234a comprises a plate that is integral with the shoe 230 and the second branch 234b comprises a second plate attached to the first plate. In the case of metal elements, the plates are attached to one another by welding, for example.

Each plate is parallel to the contact plane 110, that is to say, to the contact faces.

In the embodiment of the invention, the bearing washer 214 has a central crown and an outer crown that is thinner than the central crown.

Each branch 234a-b, that is to say each plate, then comprises a circular imprint, the diameter of which is between the diameter of the central crown and the diameter of the outer crown. Thus, the central crown is received in the imprint of the two branches 234a-b. The bearing washer 214 is introduced into and removed from the clamp 232 by spreading the branches 234a-b.

The assembly 100 also has, for each bolt 202, an anti-rotation system 300 which prevents the bolt 202 from rotating once it has been tightened.

The anti-rotation system 300 comprises an immobilizing plate 302 removably attached to the shoe 230. In this case, the immobilizing plate 302 is attached by means of a screw 306 which is screwed into the shoe 230.

The head 206 of the bolt 202 has an external imprint which permits engagement with a driving tool.

The immobilizing plate 302 has a counter-imprint, where the external imprint of the head 206 and the counter-imprint cooperate in order to prevent the immobilizing plate 302 from rotating relative to the head 206 of the bolt 202 about its axis.

In the embodiment of the invention presented here, the external imprint is a star-shaped male imprint and the counter-imprint is a star-shaped female imprint.

The immobilizing plate 302 has an immobilizing window 304, which in this case is oblong in shape, which allows the stem of the screw 306 to pass through while allowing freedom of position for the immobilizing plate 302. Thus, when the screw 306 is in place, the immobilizing plate 302 is arrested in rotation and, consequently, the bolt 202 is also immobilized in rotation. It is the screw 306 which removably attaches the immobilizing plate to the shoe.

In the embodiment of the invention shown in FIG. 2, the engine mount is a front engine mount, but it applies in the same manner to a rear engine mount.

In the same manner, the axis of the threaded stem is oriented vertically, but it could adopt a different orientation.

In the same manner, the attachment system sandwiches the sole plate of the pylon, but it is possible to provide that the attachment system sandwiches another part of the pylon.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly for an aircraft, said assembly comprising:
a pylon having a bearing face and a contact face oriented away from the bearing face,
an engine mount having a bearing face and a contact face oriented away from the bearing face, where the contact face of the engine mount bears against the contact face of the pylon,
at least two bolts, each one comprising a threaded stem with a head and a nut bearing against the bearing face of the engine mount,
for each head, a bearing washer with a first bearing face and a second bearing face, where the second bearing face of the bearing washer bears against the bearing face of the pylon, and where the head bears against the first bearing face of the bearing washer,
a shoe, and
for each bearing washer, a clamp that is secured to the shoe and comprises a first branch and a second branch between which the bearing washer is clamped and is free to rotate about its axis.

2. The assembly according to claim 1, wherein the first branch is against the first bearing face of the bearing washer and the second branch is against the second bearing face of the bearing washer.

3. The assembly according to claim 2,
wherein each branch comprises a plate,
wherein the bearing washer has a central crown and an outer crown that is thinner than the central crown, and
wherein each plate comprises a circular imprint, a diameter of which is between the diameter of the central crown and the diameter of the outer crown.

4. The assembly according to claim 1, further comprising, for each bolt, an immobilizing plate removably attached to the shoe, wherein the head has an external imprint, and wherein the immobilizing plate has a counter-imprint, where the external imprint and the counter-imprint cooperate in order to prevent the immobilizing plate from rotating relative to the head of the bolt.

5. An aircraft comprising at least one assembly according to claim 1.

* * * * *